United States Patent [19]

Noeske et al.

[11] 3,875,235

[45] Apr. 1, 1975

[54] PROCESS FOR THE PREPARATION OF TERTIARY AMINES OF HIGH PURITY

[75] Inventors: Heinz Noeske, Oberhausen; Hans Feichtinger, Dinslaken, both of Germany

[73] Assignee: Ruhrchemie Aktiengesellschaft, Oberhausen, Germany

[22] Filed: Jan. 24, 1973

[21] Appl. No.: 326,182

[30] Foreign Application Priority Data
Feb. 9, 1972 Germany............................ 2205958

[52] U.S. Cl............................ 260/585 B, 260/583 R
[51] Int. Cl............................................. C07c 85/06
[58] Field of Search......... 260/585 B, 583 N, 583 R

[56] References Cited
UNITED STATES PATENTS
3,152,185  10/1964  Zvejnieks....................... 260/585 R FOREIGN PATENTS OR APPLICATIONS
586,470  3/1947  United Kingdom............. 260/585 R
863,823  4/1941  France............................. 260/585 B
1,257,783  1/1968  Germany.......................... 260/583 R

*Primary Examiner*—Lewis Gotts
*Assistant Examiner*—D. R. Phillips
*Attorney, Agent, or Firm*—Bierman & Bierman

[57] ABSTRACT

A raw amine mixture resulting from reaction of a primary alcohol with ammonia in the presence of a hydrogenation/dehydrogenation catalyst is distilled. After distilling off a prerunning, which contains unreacted alcohol and side products which are formed during the reaction and have a like number of carbon atoms, the remaining distillation residue or a fraction thereof containing the bulk of the tertiary amine is treated with hydrogen. The treatment is carried out at 160° to 250°C and in the presence of a hydrogenation/dehydrogenation catalyst. The catalyst is then separated and the tertiary amine is distilled of from the resulting product. The treatment with hydrogen is preferably performed at atmospheric or slightly increased pressure and in the presence of catalysts containing at least one metal of group VIII B and optionally a metal of group VI B of the periodic table. Tertiary amines of high purity are obtained.

12 Claims, No Drawings

PROCESS FOR THE PREPARATION OF TERTIARY AMINES OF HIGH PURITY

It is known to prepare tertiary amines by reaction of primary alcohols with ammonia in the presence of a hydrogenation/dehydrogenation catalyst (U.S. Pat. No. 2,953,601). This known process is carried out at atmospheric pressure. Water formed during the reaction is separated as an azeotropic mixture with the unreacted alcohol. The unreacted alcohol is recovered and recirculated to the reaction mixture. Yields of 58 to 65 percent by weight are obtained. Side products having boiling points within the boiling range of the desired tertiary amines are formed. They are difficult to separate from the desired tertiary amine. Simple distillative separation is impossible.

In U.S. Pat. No. 3,223,734, tertiary amines are prepared by a two-stage process. In the first stage, a saturated alcohol having 4 to 22 carbon atoms is reacted with ammonia in the presence of a hydrogenation/dehydrogenation catalyst. To the resulting product comprising primary, secondary and tertiary amines as well as unreacted alcohol, further alcohol is added. The resultant mixture is converted to tertiary amines in a second stage at 190° to 230°C. Reaction water is separated azeotropically. Although this process affords higher yields, it is impossible to obtain by simple distillation tertiary amines which are pure enough to meet technical requirements. Carboxylic acid amides, nitriles, hydrocarbons and acetals are obtained as side products. The latter is not separable by distillation owing to the hereinbefore mentioned reasons.

It is an object of the present invention to provide a process which allows the working up of raw amines obtained by reaction of alcohol and ammonia at atmospheric pressure, in the presence of a hydrogenation/dehydrogenation catalyst, to highly pure tertiary amines by a single distillation step.

This is accomplished by distilling off from the raw amine mixture, a prerunning containing unreacted alcohol and side product having the same number of carbon atoms, then treating the remaining distillation residue with hydroen directly or after a distillation (in order to obtain a fraction, containing the bulk of the tertiary amine) in the presence of a hydrogenation/dehydrogenation catalyst at a temperature of 160° to 250°C.

The invention therefore comprises in a process for the preparation of pure tertiary amines from raw amine mixtures obtained in known manner by reaction of primary alcohols with ammonia in the presence of hydrogenation/dehydrogenation catalysts. The instant process comprises distilling off from a raw amine mixture, a prerunning containing unreated alcohol and side products having a like number of carbon atoms, treating the remaining distillation residue or a fraction thereof, containing the bulk of the tertiary amine, respectively with hydrogen, at a temperature of from 160° to 250°C and in the presence of a hydrogenation/dehydrogenation catalyst, then distilling off the tertiary amine from the product obtained after separation of the catalyst.

Advantageously, the treatment with hydrogen is carried out in a stirring vessel, at a temperature between 160° and 190°C, and preferably at atmosphere or slightly elevated pressure up to 10 atmospheres gauge. Especially well suited are conventional hydrogenation/dehydrogenation catalysts containing at least one metal of group VIII B and optionally at least one metal of group VI B of the periodic table and/or compounds of the said metals respectively, to which activators may be added. Preferred are nickel containing carrier catalysts, for example, catalysts, of the following composition:

nickel (56 – 57 percent by weight, based on the weight of the composition), magnesium oxide and distomaceous earth nickel (about 25 percent by weight, based on the weight of the composition), aluminum oxide and diatomaceous earth nickel (about 50 percent by weight, based on the weight of the composition), chromium (3) -oxide and diatomaceous earth nickel (about 52 – 53 percent by weight, based on the weight of the composition), chromium(3)-oxide and diatomaceous earth The catalysts are used in the form of dispersions. Hydrogen is introduced in less than the stoichiometric amount, for example, about 5 mole %, based upon the raw amine mixture to be treated. The duration of the aftertreatment fluctuates depending upon the amount of impurities present. The average duration of the aftertreatment is from 4 to 6 hours. The catalyst is added in an amount of 2 to 10 percent by weight, based upon the weight of the starting raw amine mixture. After termination of the reaction, the catalyst is separated by filtration and the hydrogen treated amine mixture is distilled. By simple fractionation, preferably under vacuum, the desired tertiary amine is obtained with a purity of more than 98 percent by weight. The process of the present invention is especially well suited for working up raw amine mixtures obtained by the conventional one- or two-step conversion of primary alcohols having 2 to 20 carbon atoms with ammonia in the presence of hydrogenation/ dehydrogenation catalysts. Aliphatic alcohols having 2 to 20 carbons atoms, which may possess cycloaliphatic, aromatic or heterocyclic substituents are used as starting materials.

The hydrogen treatment may also be combined with the amination process for the production of the said raw amine mixtures, with both reactions being performed with the same catalyst. In this event, the prerunning is distilled off from the raw amine mixture without separation of the catalyst employed in the amination reaction, and the remaining distillation residue is treated with hydrogen in the presence of said catalyst. At the following distillation an enrichment of the tertiary amine of more than 98 percent by weight is achieved.

The present invention will now be illustrated with reference to the following examples in which starting materials obtained in conventional amination processes are worked up.

EXAMPLE 1 (COMPARISON TEST)

3.6 kg of a commercially available nickel containing carrier catalyst (containing 56 to 57 percent by weight nickel, magnesium oxide and distomaceous earth) are admixed with 36 kg isononylalcohol in a 100 l reaction vessel. Over a period of 4 hour, 1.4 kg gaseous ammonia are introduced into the catalyst dispersion, under vigorous stirring, and at a temperature of 180°C. Water formed during the reaction is continuously removed by means of a connected phase separator and reflux cooler. The alcohol settles as the lower phase, and is continuously recirculated to the reaction vessel. After 4 hours, the ammonia addition is terminated. Heating is continued for 3 hours thereafter without introduction of ammonia. During this final reaction, the water which forms is removed. In the hereinbefore mentioned two reaction steps, a weak stream of hydrogen is passed through the reactor in order to increase the catalyst activity and to accelerate removal of the reaction water. After termination of the reaction, the catalyst is separated by centrifuging. The resulting reaction mixture contains 82 percent by weight tertiary amine and 6 percent by weight secondary amine. By vacuum distillation, a main fraction having a content of 91 percent by weight tertiary amine is separated from the said reaction mixture in an amount of 80 percent by weight. Further distillation of a part of said main fraction (146°C/0.1 mm Hg) in an annular clearance distillation column with a separation efficiency of 50 theoretical bottoms, affords a main fraction having a content of 91.8 percent by weight tertiary amine. Even though a twofold distillation is carried out, it is impossible to enrich the tertiary amine by way of distillation without employing the treatment according to the present invention.

For comparative purposes, 1 kg of the hereinbefore mentioned main fraction is treated in a round bottle under stirring, for 6 hours, with a slow stream of hydrogen (3 l/h). The treatment is carried out at a temperature of 180°C and in the presence of 5 percent by weight of a commercially available nickel containing carrier catalyst containing 56 to 57 percent by weight nickel and carrier material. The catalyst is then removed by filtration and the filtrate is distilled under vacuum (without the use of a column). Upon subsequent fractionation, triisononylamine having a purity of 99.0 percent by weight is obtained. The hydrogen treatment of the present invention, causes decomposition of side products which suppress the distillative enrichment of the desired tertiary amine.

EXAMPLE 2

Under similar conditions as described in Example 1, raw tri-n-butylamine is prepared in an autoclave equipped with a device for the azetropic separation of water. The said raw amine is distilled in a 1 m packed tower and yields about 13% by weight, based on the weight of the entire amount of the starting material, of a prerunning; 82 percent by weight, based on the weight of the entire amount of starting material, of a fraction having a content of 88 percent by weight of tertiary amine; and 5 percent by weight, based on the weight of the entire amount of starting material, of a residue. 1,000 g of the fraction consisting preponderantly of the tertiary amine, containing 50 g of the nickel carrier catalyst as described in Example 1, are stirred for 6 hours at 180°C. 5 l hydrogen/h are passed through the resulting catalyst suspension. After separation of the catalyst by filtration, the reaction product is distilled under vacuum. 82% by weight, based on the weight of the starting material, of a main fraction a content of 98.0% by weight tertiary amine are obtained at 106° to 110°C and 25 mm Hg.

EXAMPLE 3

Raw triisooctylamine prepared as described in Example 1, can only enriched, to a content of 91 percent by weight tertiary amine, by a vacuum distillation as described in Example 2. The main fraction thereby obtained comprises about 79 percent by weight of the entire reaction product. 1,100 g of the said product are aftertreated with a hydrogen stream, introduced at the rate of 5 l/h over a period of 6 hours, at 170°C, and in the presence of 45 g of a nickel containing carrier catalyst as described in Example 1. The catalyst is then separated by filtration. 1040 g of final product are thereby obtained. This final product is subjected to vacuum/distillation. 850 go of a main fraction, having a tertiary amine content of 99.9 percent by weight, are collected at 126° to 131°C and 0.1 mm Hg.

EXAMPLE 4

Raw triisodecylamine is prepared from isodecylalcohol and ammonia, as described in Example 1. During the preparation thereof, water is separated by azeotropic distillation at 300 mm Hg. The catalyst is separated by filtration. A prerunning comprising 14 percent by weight of the filtrate and containing non-reacted isodecylalcohol and small amounts of side products having the same number of carbon atoms, is distilled off under vacuum. After the separation of the prerunning, the remaining residue is treated with hydrogen in the presence of 40 g of a nickel and chromium containing carrier catalyst per kg of the said distillation residue. The catalyst has the following composition: 100 parts by weight nickel, 30 parts by weight $Cr_2O_3$, 50 percent by weight diatomaceous earth. 4 l hydrogen/h are introduced into the catalyst suspension, under stirring, and at 180°C, over a period of 6 hours. The reaction mixture is filtered and the filtrate is subjected to vacuum distillation. 730 g of a main fraction, having a content of 98.2 percent by weight of tertiary amine are obtained at a temperature of 165° to 170°C, and a pressure of 0.05 mm Hg.

EXAMPLE 5

34 kg isotridecylalcohol are admixed in a 100 l reaction vessel with 3.4 kg of a nickel containing carrier catalyst, as described in Example 1. The mixture is heated to 180°C with stirring and under a vacuum of 250 mm Hg, while 1.1 kg of gaseous ammonia are introduced therein over a period of 6 hours. After termination of the ammonia addition, an additional small amount of hydrogen is added, and the reaction mixture is subjected to a final reaction for 3 hours. Then the vacuum applied to the reactor is increased to 30 mm Hg and 2.6 kg of a prerunning is distilled off at a bottom temperature of 180°C. The resultant product which is free of the prerunning is treated, according to the invention, with hydrogen over a period of 6 hours at a temperature of 180°C. The catalyst is separated by filtration. A main fraction of 18 kg, having a content of 98.8 percent by weight of tertiary amine, is distilled off at a temperature of 205° to 210°C under a vacuum of 0.05 mm Hg.

As can be seen from the example, the quanity of catalyst used for the aftertreatment of raw amination products with hydrogen is preferably about 5 percent by weight, based upon the starting raw amine mixture. With the combined amination and hydrogen treatment, a higher amount of catalyst, preferably up to about 10 percent by weight, based upon the starting raw amine mixture, is preferably employed.

What is claimed is:

1. A process for the preparation of pure tertiary amine from a raw amine mixture obtained by reaction of a primary alcohol with ammonia in the presence of a hydrogenation/dehydrogenation catalyst, which comprises distilling off from said raw amine mixture a prerunning containing nonreacted alcohol and side products having a like number of carbon atoms, treating remaining distillation residue or a fraction thereof, which contains the bulk of the tertiary amine with hydrogen at a temperature of from 160° to 250°C in the presence of a hydrogenation/dehydrogenation catalyst, separating the catalyst from the treated residue, and distilling off the tertiary amine from the treated residue after separation of the catalyst.

2. The process as claimed in claim 1, wherein the treating step is carried out at a temperature of from 160° to 190°C.

3. The process as claimed in claim 1, wherein the treating step is carried out at from atmospheric pressure up to about 10 atmospheres gauge.

4. The process as claimed in claim 1, wherein the treating step is carried out in the presence of a hydrogenation/dehydrogenation catalyst containing at least one metal of group VIII B of the periodic table.

5. The process as claimed in claim 4, wherein the hydrogenation/dehydrogenation catalyst employed in the treating step additionally contains at least one metal of group VI B of the periodic table.

6. The process according to claim 1, wherein the prerunning is distilled off from the raw amine mixture without separation of the hydrogenation/dehydrogenation catalyst employed in the reaction of the primary alcohol with ammonia, and the unseparated catalyst is employed as the hydrogenation/dehydrogenation catalyst in said treating step.

7. The process according to claim 1, wherein the raw amine mixture is prepared from primary alcohols having 2 to 20 carbon atoms.

8. The process as claimed in claim 1, wherein in said treating step about 5 mole percent of hydrogen, based upon the raw amine mixture, is employed.

9. The process as claimed in claim 1, wherein said treating step has an average duration of from 4 to 6 hours.

10. The process as claimed in claim 1, wherein the catalyst employed in the treating step is present in an amount of up to about 10 percent by weight, based on the raw amine mixture.

11. The process as claimed in claim 1, wherein the catalyst employed in the treating step is present in an amount of 2 to 10% by weight, based on the raw amine mixture.

12. The process as claimed in claim 1, wherein the catalyst employed in the treating step is present in an amount of about 5% by weight based on the raw amine mixture.

* * * * *